United States Patent [19]
Kaneda et al.

[11] Patent Number: 5,379,960
[45] Date of Patent: Jan. 10, 1995

[54] TAPE CASSETTE CASING HAVING AN ATTACHING CYLINDRICAL PORTION WITH AT LEAST ONE RIB FOR RETAINING A REEL SPRING

[75] Inventors: Hiroshi Kaneda, Saku; Kenji Hashizume, Miyota, both of Japan

[73] Assignee: TDK Corporation, Tokyo, Japan

[21] Appl. No.: 71,271

[22] Filed: Jun. 4, 1993

[30] Foreign Application Priority Data

Jun. 4, 1992 [JP] Japan .................. 4-044389

[51] Int. Cl.$^6$ ............................................. G11B 15/32
[52] U.S. Cl. ............................................... 242/345.2
[58] Field of Search ............... 242/197, 198, 199, 345, 242/200; 360/132

[56] References Cited

U.S. PATENT DOCUMENTS

| | | | |
|---|---|---|---|
| 4,428,547 | 1/1984 | Gotoh | 242/199 |
| 4,646,191 | 2/1987 | Goto | 242/199 X |
| 4,669,021 | 5/1987 | Wakui et al. | 242/199 X |
| 4,687,157 | 8/1987 | Schoettle et al. | 242/199 |
| 4,712,149 | 12/1981 | Goto et al. | 242/199 X |
| 4,899,243 | 2/1990 | Berdignon | 242/199 X |
| 4,986,491 | 1/1991 | Gelardi et al. | 242/199 |
| 5,042,740 | 8/1991 | Schoettle et al. | 242/199 |
| 5,142,761 | 9/1992 | Gelardi et al. | 242/199 X |

FOREIGN PATENT DOCUMENTS 58-179690 12/1983 Japan.

*Primary Examiner*—Daniel P. Stodola
*Assistant Examiner*—John P. Darling
*Attorney, Agent, or Firm*—Oblon, Spivak, McClelland, Maier & Neustadt

[57] ABSTRACT

A tape cassette includes a case comprising synthetic resin upper and lower cases which are integrally combined and rotatably provided with a couple of tape reels wound with a tape-like medium and a reel spring for restricting a vertical motion of the couple of tape reels. An attaching portion for retaining the reel spring is protruded on an inner face of the upper casing. The attaching portion or said lower case is provided with a rib or ribs for fixing the reel spring whereby weldings of the rib or ribs and the reel spring and of the upper and lower cases are simultaneously performed.

6 Claims, 5 Drawing Sheets

TAPE CASSETTE CASING HAVING AN ATTACHING CYLINDRICAL PORTION WITH AT LEAST ONE RIB FOR RETAINING A REEL SPRING

BACKGROUND OF THE INVENTION

1. Field of the Invention

This invention relates to a tape cassette such as a video cassette or a digital audio tape (DAT) wherein a record medium, for instance, a tape-like medium is accommodated in a case.

2. Discussion of Background

Generally speaking, an information medium of a video cassette is apt to be stained with dirt and dust and is damageable in handling thereof. This case is constructed by welding and combining an upper case and a lower case made of synthetic resin at their welding portions. A reel spring is provided on an inner face of the upper case which restrains a vertical motion of a couple of tape reels.

In a case for accommodating a record medium in a conventional video cassette, after the reel spring is welded to the upper case, the upper and lower cases are integrally combined by welding. Therefore, a step of welding the reel spring and a step of welding the upper and lower cases are separately performed, which hampers the production efficiency. Further, the integration of the reel spring is complicated since it is necessary to provide the reel spring at a prescribed position, which also hampers the production efficiency.

SUMMARY OF THE INVENTION

It is an object of the present invention to avoid these conventional drawbacks, and to provide a reliable tape cassette wherein the production efficiency in making thereof is considerably promoted by simultaneously performing the welding step of the upper and lower cases and the welding step of the reel spring.

According to an aspect of the present invention, there is provided a tape cassette which includes a case comprising synthetic resin upper and lower cases which are integrally combined and rotatably provided with a couple of tape reels wound with a tape-like medium and a reel spring for restricting a vertical motion of said couple of tape reels, wherein an attaching portion for retaining said reel spring is protruded on an inner face of the upper casing, said attaching portion or said lower case being provided with a rib or ribs for fixing the reel spring whereby weldings of the rib or ribs and the reel spring and of the upper and lower cases are simultaneously performed.

In welding and integrating the upper and lower cases by a welding horn, the reel spring is fitted to the rib or ribs for welding provided on the attaching portion which are protruded on the inner face of the upper case and mounted thereon, on top of which the lower case is engaged and the upper and lower cases are welded at the attaching portion along with the other welding portions of the upper and lower cases. Then, the welding rib or ribs on the attaching portion are molten and the reel spring is welded to the inner faces of the upper and lower cases. At the same time, the attaching portion is fixed to the lower case thereby integrally combining the upper and lower cases. Free ends of the reel spring are accurately disposed on the couple of tape reels. The restriction of the vertical motion of the couple of tape reels is performed with certainty, thereby enabling the formation of a reliable tape cassette.

DETAILED DESCRIPTION OF THE PREFERRED EMBODIMENTS

Figure 1:
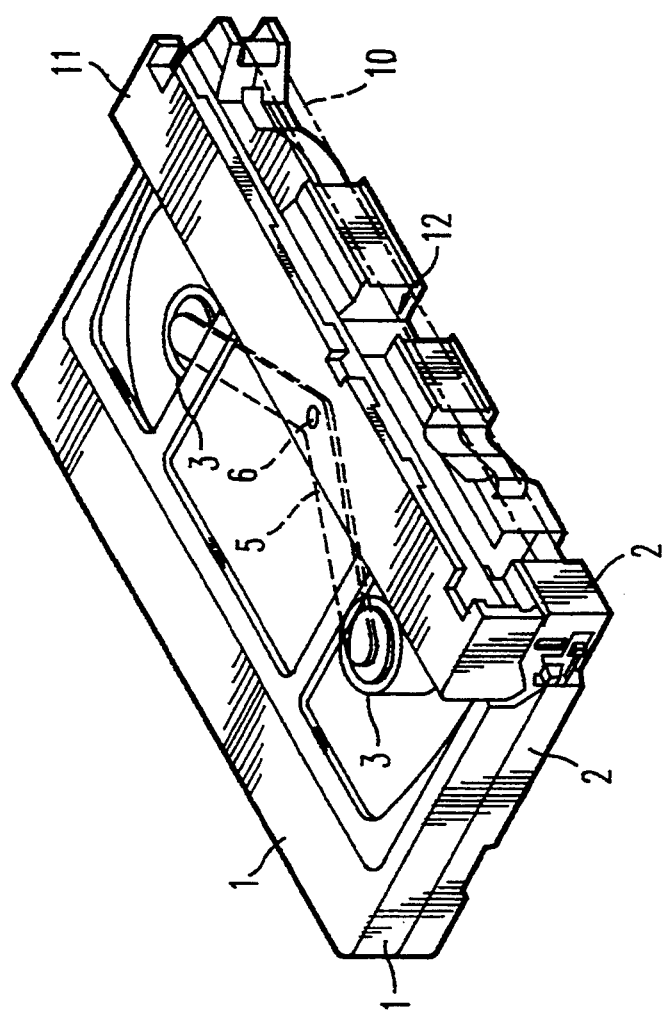
FIG. 1 is a perspective view of an embodiment in use according to the present invention.
Figure 2:
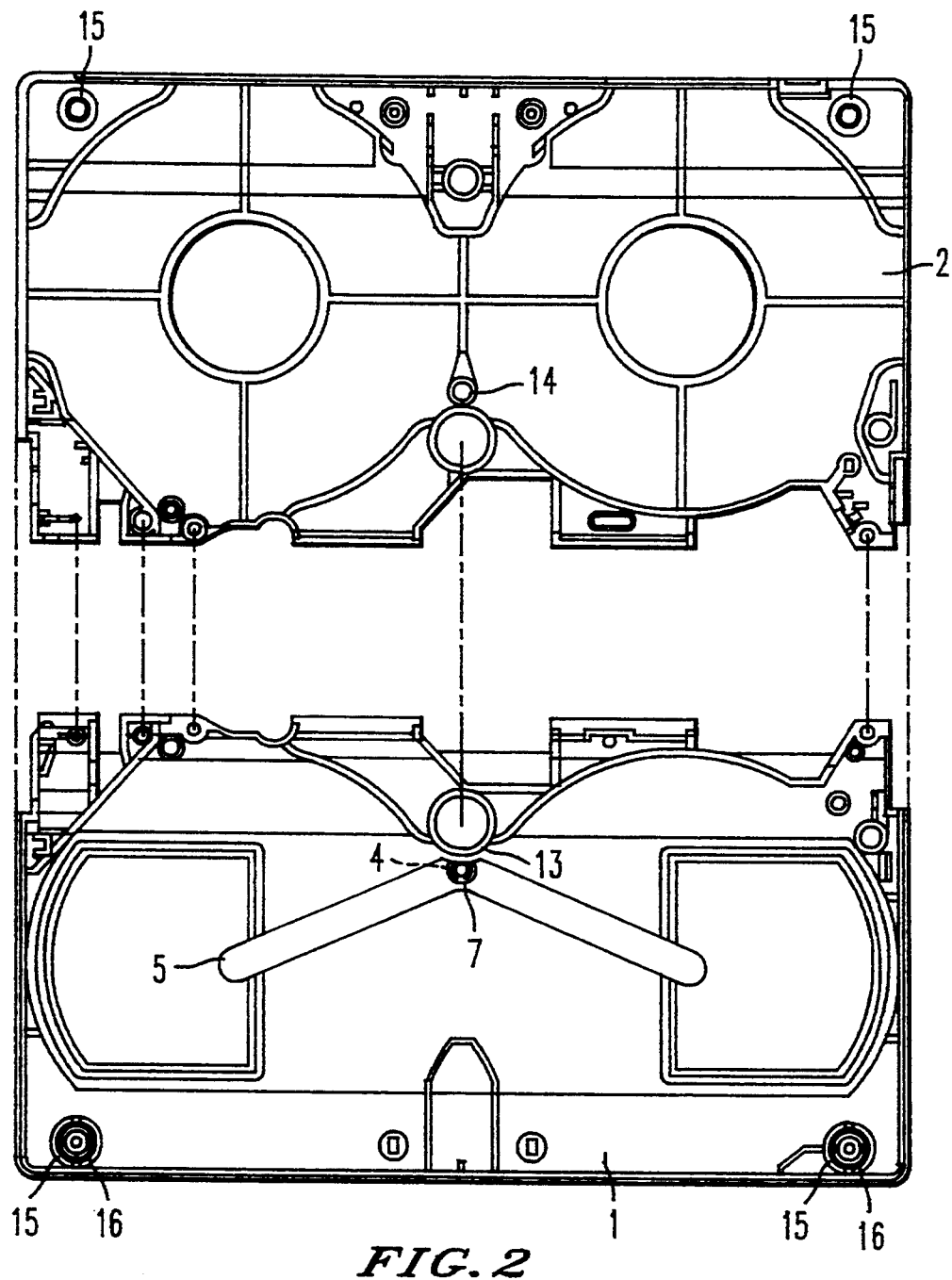
FIG. 2 is a plane view of an upper case and a lower case in their separated and exploded state of the example in FIG. 1.

An explanation will be given of an Example in reference to FIGS. 1 through 4. A case made of synthetic resin such as ABS resin, PS resin, PC resin, PP resin, is composed of an upper case 1 and a lower case 2, which is rotatably provided with a couple of tape reels 3 wound with a tape-like medium 10. An attaching portion 4 for retaining a reel spring 5 is protruded on an inner face of the upper case 1 for providing the reel spring 5 which restrains the vertical motion of the tape reels 3. The attaching portion 4 is provided with ribs for welding 6 for fixing the ribs to the reel spring 5 and the lower case 2. A tape-like medium 10 is accommodated in the case by welding the upper and lower cases at the ribs for welding along with other welding portions 15. To achieve the construction, the upper and lower cases 1 and 2 are integrally fixed by welding the welding ribs by a welding horn from outside the case, employing bosses wherein the attaching portion 4 and the welding portions 15 are protruded on an inner face or faces of one or both of the upper and lower cases, and the ribs for welding 6 and 16 on top faces of the bosses.

In this case, the attaching portion 4 is provided on the upper case 1. However, the attaching portion 4 may be provided on the lower case 2 in correspondence with the upper case 1. Opposingly providing an annular boss 14, or a columnar body, or a cylindrical body contacting the attaching portion 4, can be selected in a corresponding relationship between the upper and lower cases. Further, selecting the welding portions 15 at four-corner portions or central portions of the case other than a medium accommodating area, which are similar to conventional tapping portions, improves the total balance and the rigidity of the cassette half, which is effective since there is no disadvantage in appearance due to extruded portions after welding.

Further, the attaching portion 4 is a columnar boss having receiving ribs 41 on its outer periphery, and is a welding portion protruded with the ribs for welding 6 on the top face of the boss, which is to be inserted into engaging holes 7 formed in the reel spring 5. The rib for welding 6 is constructed by a protrusion in a square form, in an elliptic form, or in a segmented circle form, wherein a consideration is given such that a tacking positioning can be performed, and the free ends of the reel spring 5 are precisely disposed at central positions of the tape reels 3.

A plate spring having approximately an inverted-V like form is employed for the reel spring 5, which may be provided with the engaging holes 7 for inserting the ribs for welding 6 at their inner portions, and a cut-off portion 8 for engaging with a guide wall 13 in accordance with the necessity.

Figure 3:
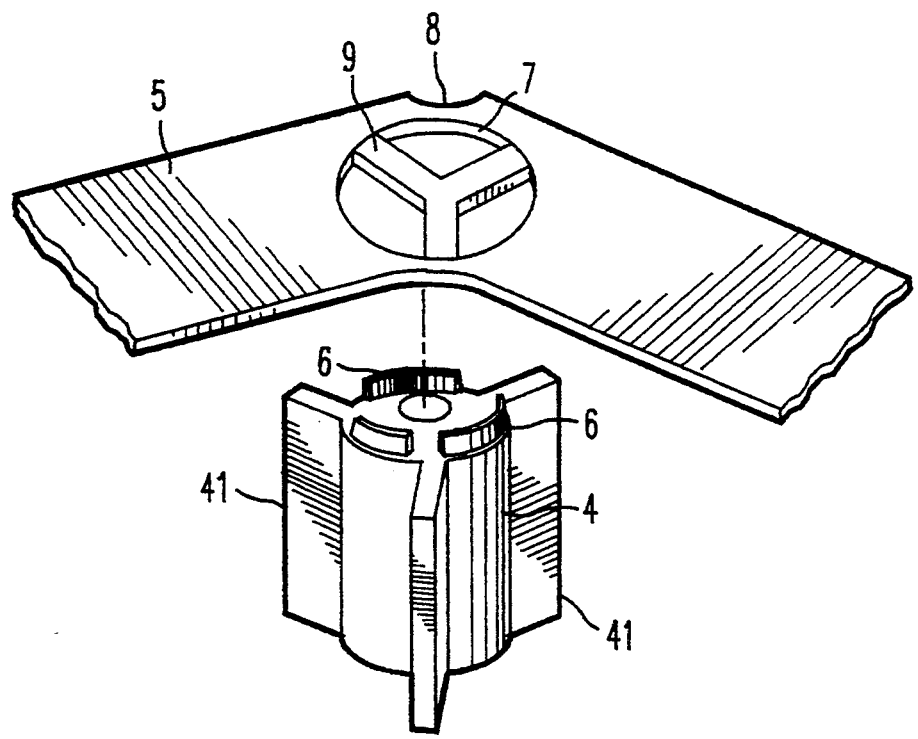
FIG. 3 is a magnified perspective view of a portion of a reel spring in its separated state.
Figure 4:
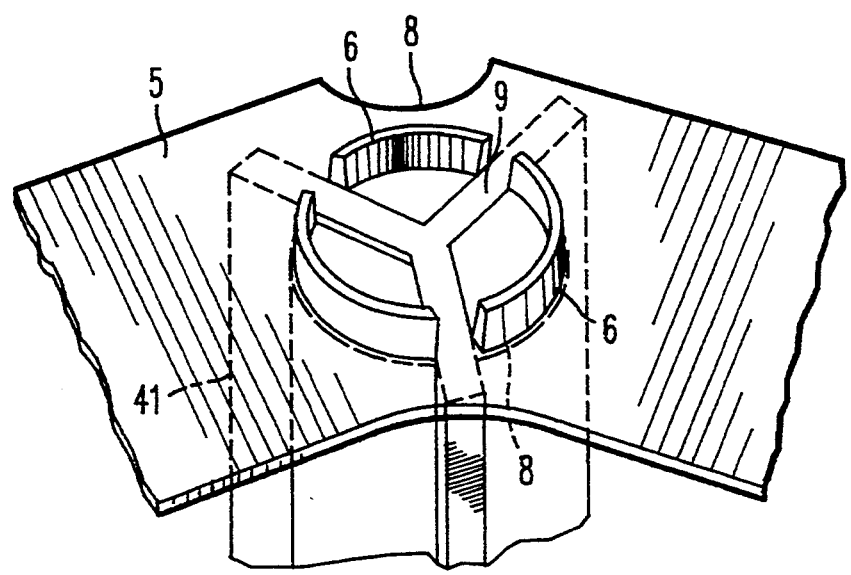
FIG. 4 is a perspective view of a portion of the reel spring of the example in FIG. 3 in its integrated state.

As shown in FIGS. 3 and 4, the engaging holes 7 formed by punching through the reel spring 5 are provided with partition pieces 9. These partition pieces 9 are effective in providing a tacking function by fitting them into clearances among the ribs for welding 6, and are convenient since the positioning thereof can simultaneously be performed.

Further, a front lid 11 is rotatably provided to the case which opens and closes openings 12 of the upper and lower cases 1 and 2, which contributes to the exposure and the protection of the tape 10.

Figure 5:
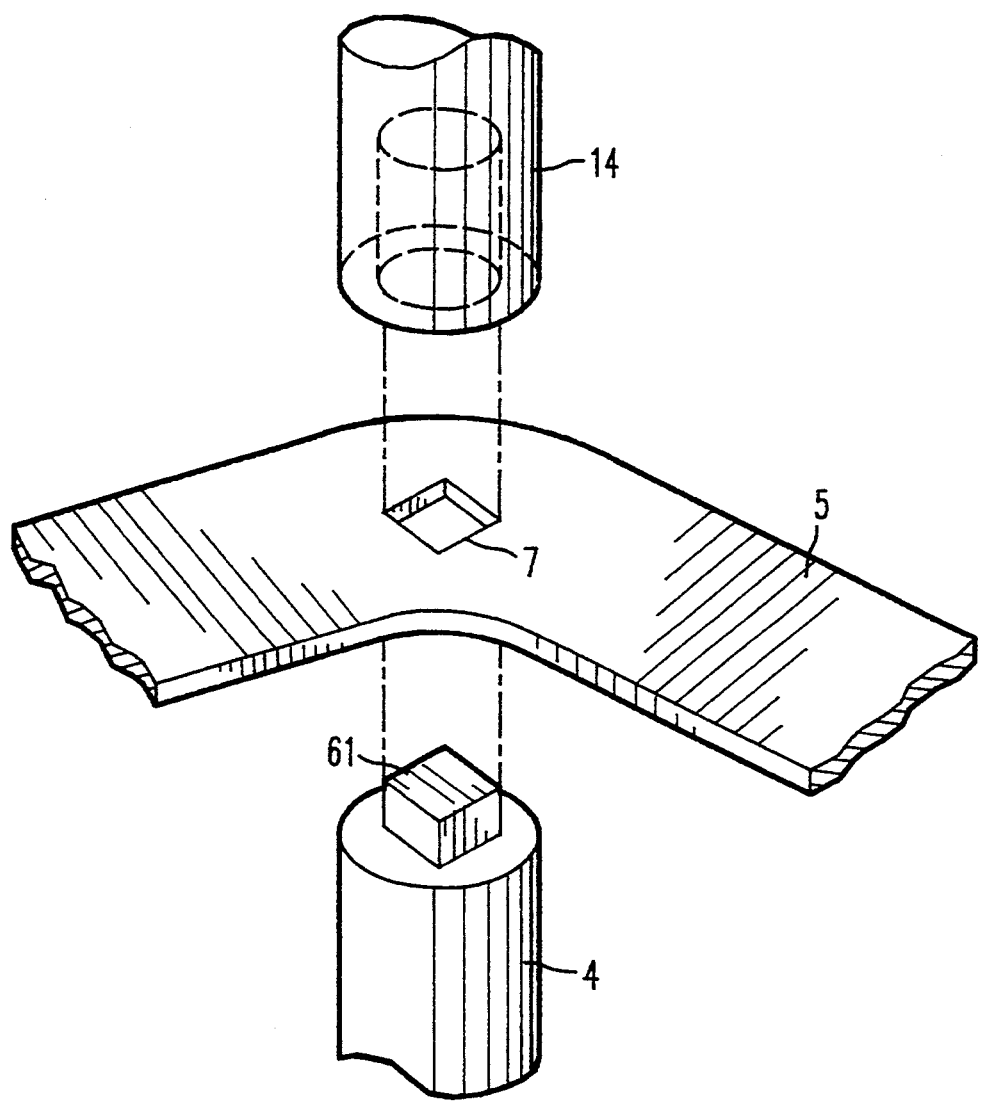
FIG. 5 is a perspective view of a portion of another embodiment of this invention in its separated state before integration of a case.
Figure 6:
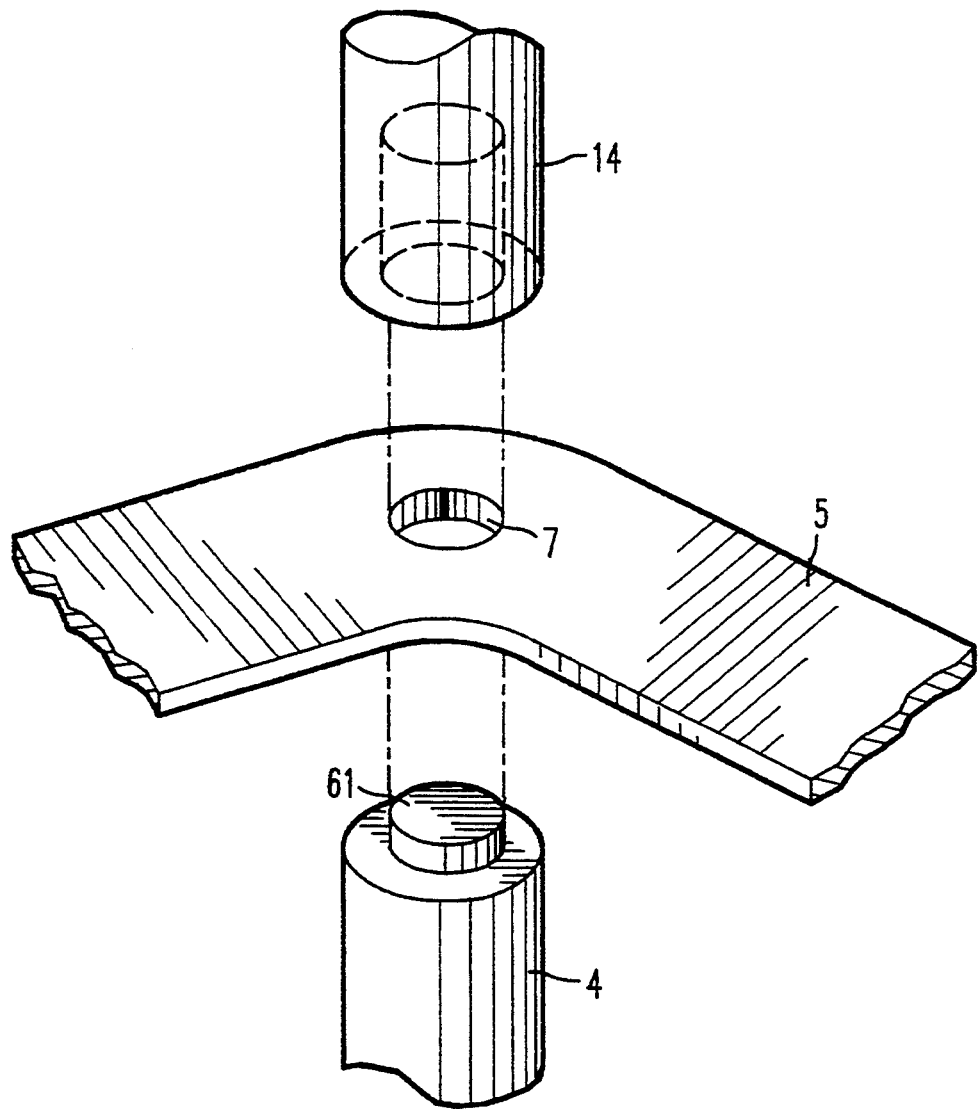
FIG. 6 is a perspective view of a portion of a further embodiment of this invention in its separated state before integration of a case.

In an embodiment of FIG. 5, a welding portion 61 in a square form is protruded on the attaching portion 4 of a case, which fits to a boss 14 protruded on an opposing case for welding and integration, which is convenient since the positioning thereof is performed by a square hole 7 of the reel spring 5.

In the above respective Examples, the welding portion may be composed of an annular boss, on the top face of which the ribs for welding 6 in a ring-like form or of intermittently arranged annular segments are provided, and a protrusion for fitting into the annular boss, for instance, a cylindrical body or a columnar body may be protruded on the inner face of an opposing case, thereby providing the positioning function. This fitting structure may be utilized for promoting the accuracy of the welding step and the operational performance by providing a tacking function in accordance with the necessity.

According to this invention, the case rotatably provided with the couple of tape reels wound with a tape-like medium and the reel spring for restricting the vertical motion of the couple of tape reels, is composed of the synthetic resin upper and lower cases. The tape cassette is integrated with the upper and lower cases. The attaching portion for retaining the reel spring is protruded on the inner face of the upper case. The attaching portion is provided with the ribs for welding for fixing the reel spring and the lower case. Accordingly, the present invention provides a practical effect wherein the step of welding the upper and lower cases and the step of welding the reel spring to the upper case are combined into a single step, the protection efficiency can considerably be promoted, the integration of the reel spring to the case can accurately and simply be performed, the precise combination operation can be performed, the welding combination of the case is strong, the tape cassette can safely be employed without adversely influencing a record and playback medium, the quality thereof is promoted, the integration performance and the reliability can considerably be promoted, and the commercial value thereof can be enhanced.

What is claimed is:

1. A tape cassette which includes a case comprising synthetic resin upper and lower cases which are integrally combined and provided with rotatable tape reels wound with a tape-like medium and a reel spring for restricting a vertical motion of said tape reels, said tape cassette comprising:

an attaching cylindrical portion for retaining said reel spring, said attaching cylindrical portion protruding from an inner face of one of said upper or lower cases, an end face of said attaching cylindrical portion comprising a plurality of circumferentially spaced apart ribs which are each insertable into corresponding engaging holes in said reel spring so as to tack said reel spring to said one of said upper or lower cases and permit a simultaneous welding of said plurality of ribs, the upper case and the lower case.

2. The tape cassette according to claim 1, wherein said plurality of ribs define a segmented circle form.

3. A tape cassette which includes a case comprising synthetic resin upper and lower cases which are integrally combined and provided with rotatable tape reels wound with a tape-like medium and a reel spring for restricting a vertical motion of said tape reels, said tape cassette comprising:

an attaching cylindrical portion for retaining said reel spring, said attaching cylindrical portion protruding from an inner face of one of said upper or lower cases, an end face of said attaching cylindrical portion comprising a plurality of circumferentially spaced apart ribs which are each insertable into corresponding engaging holes in said reel spring so as to tack said reel spring to said one of said upper or lower cases and permit a simultaneous welding of said plurality of ribs, the upper case and the lower case;

wherein said reel spring comprises partition pieces positioned between said engaging holes in said reel spring, said partition pieces being insertable in corresponding spaces defined between said plurality of spaced apart ribs when said ribs are inserted into said corresponding engaging holes in said reel spring.

4. The tape cassette according to claim 3, wherein said plurality of ribs define a segmented circle form.

5. A tape cassette which includes a case comprising synthetic resin upper and lower cases which are integrally combined and provided with rotatable tape reels wound with a tape-like medium and a reel spring for restricting a vertical motion of said tape reels, said tape cassette comprising:

an attaching cylindrical portion for retaining said reel spring, said attaching cylindrical portion protruding from an inner face of one of the upper or lower cases, an end face of said attaching cylindrical portion comprising a welding rib defining a square protrusion which is insertable into a corresponding square engaging hole in said reel spring so as to tack said reel spring to said one of said upper or lower cases and permit a simultaneous welding of the plurality of ribs, the upper case and the lower case.

6. A tape cassette which includes a case comprising synthetic resin upper and lower cases which are integrally combined and provided with rotatable tape reels wound with a tape-like medium and a reel spring for restricting a vertical motion of said tape reels, said tape cassette comprising:

an attaching cylindrical portion for retaining said reel spring, said attaching cylindrical portion protruding from an inner face of one of the upper or lower cases, an end face of said attaching cylindrical portion comprising a welding rib defining an elliptical protrusion which is insertable into a corresponding engaging hole in said reel spring so as to tack said reel spring to said one of said upper or lower cases and permit a simultaneous welding of the plurality of ribs, the upper case and the lower case.

* * * * *